United States Patent [19]

Kowata et al.

[11] Patent Number: 4,682,849
[45] Date of Patent: Jul. 28, 1987

[54] OPTICAL FIBER JUNCTION AND METHOD OF MAKING SAME

[75] Inventors: Nobuo Kowata; Naoshige Sasano, both of Sagamihara, Japan

[73] Assignee: Showa Electric Wire & Cable Co. Ltd.

[21] Appl. No.: 831,079

[22] Filed: Feb. 19, 1986

Related U.S. Application Data

[60] Continuation of Ser. No. 663,597, Dec. 3, 1984, abandoned, which is a division of Ser. No. 416,585, Sep. 10, 1982, Pat. No. 4,497,643.

[30] Foreign Application Priority Data

Sep. 16, 1981 [JP] Japan ................. 56-145776

[51] Int. Cl.⁴ ................. G02B 6/40; C03B 23/20
[52] U.S. Cl. ................. 350/96.22; 65/4.2; 65/4.21; 65/4.3
[58] Field of Search ........... 65/4.1, 4.2, 4.21, 4.3, 65/36, 42; 350/96.15, 96.22, 96.24

[56] References Cited

U.S. PATENT DOCUMENTS

| | | | |
|---|---|---|---|
| 3,912,362 | 10/1975 | Hudson | 350/96 |
| 3,933,455 | 1/1976 | Chown | 65/4 |
| 4,179,185 | 12/1979 | Hawk | 350/96 |
| 4,243,296 | 1/1981 | Aulich et al. | 65/4.21 |
| 4,497,643 | 2/1985 | Kowato et al. | 65/4.21 |

Primary Examiner—Kenneth M. Schor
Assistant Examiner—Michael K. Boyer
Attorney, Agent, or Firm—Pahl, Lorusso & Loud

[57] ABSTRACT

There are disclosed an optical fiber junction device and a method of making the same. The method comprises the steps of providing a central inner pipe or rod of glass, arranging a plurality of optical fibers around the inner pipe or rod, and externally heating the optical fibers and the central inner pipe to form a thermally fused assembly having cores of a sectorial cross section. The inner pipe may include a tapered portion having a reduced diameter. The optical fibers may comprise optical fiber junction units each composed of a plurality of optical fibers.

3 Claims, 12 Drawing Figures

OPTICAL FIBER JUNCTION AND METHOD OF MAKING SAME

This is a continuation of Ser. No. 663,597, now abandoned which is a divison, of application Ser. No. 416,585, filed Sept. 10, 1982 now U.S. Pat. No. 4,497,693.

BACKGROUND OF THE INVENTION

This invention relates to an optical junction device having orderly arranged cores disposed symmetrically with respect to a central axis and a method of making such an optical junction device, and it is primarily concerned with the dividing and/or combining of light propagating in optical fibers for effecting a distribution of light between a number of discrete paths or collection of light from multiple paths into a single path.

Optical fiber junction devices include a plurality of optical fiber cores surrounded by cladding layers. For equalized distribution of optical energy among the cores without relying on mode changes, it is necessary that the cores be shaped radially sectorial in cross section and separated by the cladding layers.

Various methods have heretofore been proposed to fabricate such optical fiber junction devices. However, it has been difficult to keep a plurality of optical fiber cores orderly arranged during thermal fusion process and hence to make an optical fiber junction device having neatly shaped cores of a sectorial cross section.

SUMMARY OF THE INVENTION

The above-described drawbacks in the prior art apparatus have been successfully eliminated by the present invention.

It is an object of the present invention to provide an optical fiber junction device having a divider or coupler for dividing or coupling light into or from n branches, the divider having n equal parts of a sectorial cross section.

Another object of the present invention is to provide a method of making such an optical fiber junction device.

According to the present invention, the above object can be achieved by a method of making an optical fiber junction device, comprising the steps of providing a central inner pipe or rod of glass, arranging a plurality of optical fibers around the inner pipe or rod, and externally heating the optical fibers and the central inner pipe to form a thermally fused assembly having cores of a sectorial cross section. The inner pipe may include a tapered portion having a reduced diameter. The optical fibers may comprise optical fiber junction units each composed of a plurality of optical fibers.

These and other objects of the invention will become apparent from the following description of embodiments thereof when taken together with the drawings.

DETAILED DESCRIPTION

Figure 1:
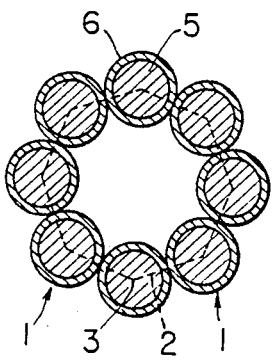
FIGS. 1 and 2 are cross-sectional views illustrative of progressive steps of making an optical fiber junction device having parts of a sectorial cross-section for dividing light at equal ratios.
Figure 2:
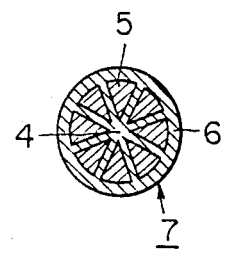

It has been customary to fabricate an optical fiber junction device having equally divided sectorial cores by positioning n optical fibers 1 at vertices 3 of a regular polygon 2 so that adjacent optical fibers 1, 1 are held against each other, as shown in FIG. 1, and then heating the optical fibers 1 to join them by fusion. Such a fabrication process is described in U.S. Pat. Nos. 3,912,362, 3,933,455 and 4,179,185. During the process, the assembly is subjected to a surface tension tending to eliminate any gap between adjacent optical fibers 1, 1. A resultant optical fiber junction device 7 is composed of a plurality of cores 5 extending radially around a central axis 4 and a cladding layer 6 surrounding the cores 5, as illustrated in FIG. 2.

The prior fabrication process however has suffered from drawbacks in that since the outside diameter of each optical fiber 1 is extremely small, 140 microns for instance, it is quite difficult and awkward to locate the optical fibers precisely at the vertices of a regular polygon, and the optical fibers 1 as they are properly positioned are apt to be displaced irregularly due to differences between the amounts of thermal strains which the optical fibers 1 undergo. Accordingly, the initial regular and orderly arrangement of the optical fibers 1 tends to be impaired, resulting in difficulty in making an optical fiber junction device having cores of a desired sectorial cross section.

The present invention will now be described with reference to the drawings.

Figure 3A:
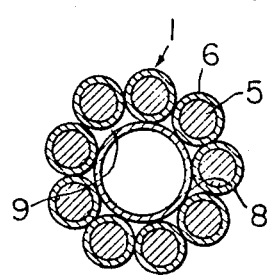
FIGS. 3A, 3B and 4A, 4B are cross-sectional view showing progressive steps of making a optical fiber junction device according to the present invention.
Figure 3B:
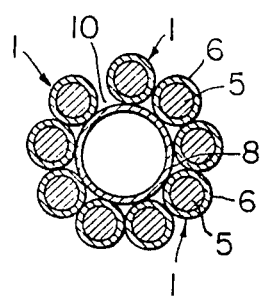

In FIG. 3, optical fibers 1 are disposed around an inner pipe 8 in intimate contact therewith. The inner pipe 8 has an outside diameter which is determined by the number of branches of an optical fiber junction device to be made and the outside diameter of each optical fiber 1. Not all of the optical fibers 1 are required to be held against the outer periphery of the inner pipe 8. There may be a space 9 as shown in FIG. 3A or a space 10 as shown in FIG. 3B, and adjacent optical fibers 1 may be out of contact with each other. For these spaces or gaps 9, 10 will be eliminated due to surface tensions which the optical fibers are subjected to when they are thermally fused together.

Figure 4A:
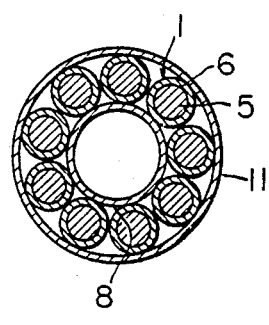
Figure 4B:
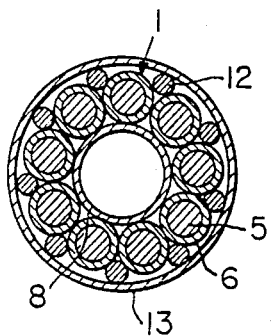

Then, as shown in FIG. 4A, an outer clamp pipe 11 is fitted over the optical fibers 1 to clamp them in position around the inner pipe 8. Another clamp means includes dummy fibers 12 (FIG. 4B) disposed in spaces between adjacent optical fibers 1 and a binder 13 such as a copper wire or string fastened around the dummy fibers 12.

Thereafter, a desired portion of the assembly is heated at a predetermined temperature whereupon the spaces between adjacent optical fibers 1 are eliminated under equal surface tensions. Thus, an optical fiber junction device having cores of a sectorial cross section is fabricated.

The inner pipe 8 should preferably be made of glass, the same material as that of the optical fibers 1, or a different material such as quartz. Where the inner pipe 8 is made of glass, having a melting point close to that of the optical fibers 1, the inner pipe 8 and the optical fibers 1 will be fused and collapse together during heating process.

Where the inner tube 8 is made of quartz, it should be pulled out when the optical fibers 1 are to be fused, and then the optical fibers 1 should be heated. An optical fiber junction device of the foregoing configuration is thus fabricated.

For connection to a single optical fiber, an end of the optical junction device is elongated and reduced in diameter upon fusion according to an ordinary process and thermally fused to the end of the single fiber.

Figure 5:
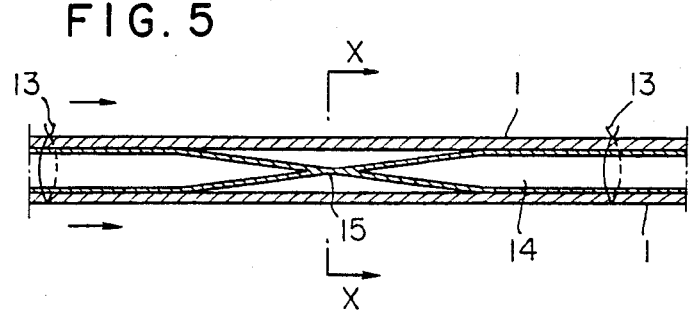
FIGS. 5 and 6 are longitudinal and transverse cross-sectional views showing steps of making an optical fiber junction device according to another embodiment of the present invention.

According to another embodiment shown in FIG. 5, an optical fiber junction device includes a central glass tube 14 having an axial tapered portion 15 which is a portion of the glass tube 14 having a reduced diameter and which is positioned between two portions of the glass tube having diameters greater than the reduced diameter. Optical fibers 1 are arranged in close contact around the glass tube 14 and fastened together by binders 13. Then the assembly is heated at the ends the optical fibers 1 held against the glass tube 14, and when fusion progresses, the tapered portion 15 is then heated.

The glass tube 14 is spaced from the optical fibers disposed therearound at the tapered portion 15. As thermal fusion advances, the optical fibers 1 are deformed into conformity with the configuration of the tapered portion 15 due to surface tension of the glass material. When the thermal fused area has reached a smallest-diameter section (X - X) of the tapered portion 15, the optical fibers 1 are elongated by being stretched in opposite directions. The assembly as it is elongated is cut off at a portion which has an outside diameter that is substantially the same as the outside diameter of a single optical fiber to be spliced. The assembly and the single optical fiber are brought into end-to-end abutment and joined by fusion, thus making an optical fiber junction device.

Figure 6:
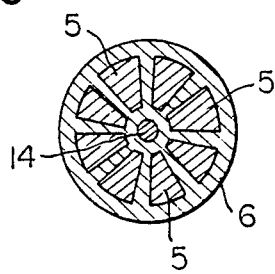

The glass tube 14 has a refractive index which is smaller than that of the optical fibers 1. With such a refractive index relationship, light propagating in a central dummy glass tube 14 (FIG. 6) can easily reenter the cores 5 of the optical fibers 1. The glass tube 14 may be replaced with a solid rod of glass.

Figure 7A:
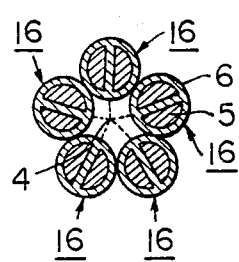
FIGS. 7A and 7B are cross-sectional views illustrative of steps of fabricating an optical fiber junction device according to still another embodiment.
Figure 7B:
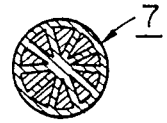
Figure 8A:
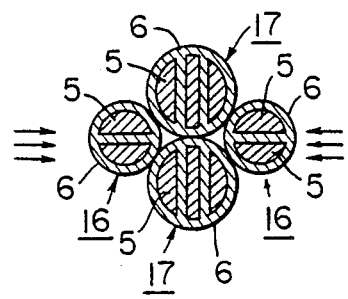
FIGS. 8A and 8B are cross-sectional views illustrative of steps of fabricating an optical fiber junction device according to still another embodiment.
Figure 8B:
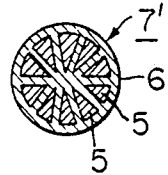

FIGS. 7 and 8 illustrate optical fiber junction devices in accordance with other embodiments of the present invention.

As shown in FIGS. 7A and 7B, a plurality of optical fiber junction units 16 are fabricated beforehand by thermally fusing optical fibers. Cores 5 and cladding layers 6 of such optical fiber junction units 16 are positioned by a suitable clamping means so as to be arranged radially with respect to a central axis 4, and then are heated and fused into an optical fiber junction device 7 having sector-shaped cores as shown in FIG. 7B.

In FIG. 8A, optical fiber junction units 16, 17 having different outside diameters are put together in intimate contact by a suitable clamping means, and heat is applied to outer peripheral surfaces of the optical fiber junction units 16, 16 of smaller diameter to produce an optical fiber junction device 7' having cores of different light division ratios.

With the embodiments shown in FIGS. 7 and 8, several optical fiber junction units are prepared in advance and then put together into an optical fiber junction device. Therefore, a large number of dividing or coupling optical fibers can easily be arranged properly and fastened together readily with a clamping means therearound.

According to the present invention, therefore, an optical fiber junction device having cores of a sectorial cross section can easily be fabricated and the insertion loss of a junction using such an optical fiber junction device can be reduced.

Thus, there are provided in according with the invention an optical fiber junction device and a method of making the same which have the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. A method of making an optical fiber junction device in which light is equally distributed through a plurality of optical fibers, comprising the steps of:
   providing a central inner pipe or rod of glass with an axial tapered portion having a reduced diameter;
   arranging a plurality of optical fibers around an outer periphery of said inner pipe or rod, said plurality of optical fibers being spaced from said outer periphery of said inner pipe or rod at said axial tapered portion;
   fixing said plurality of optical fibers in position around said outer periphery of said inner pipe or rod;
   externally heating said optical fibers and said central inner pipe or rod so as to cause said plurality of optical fibers to deform into conformity with said axial-tapered portion of said central pipe or rod of glass to form a thermally fused assembly having radially arranged cores of sectorial cross section;
   elongating said thermally fused assembly by stretching said assembly in opposite directions; and
   cutting said assembly at a location which has an outside diameter of a single optical fiber and splicing said single optical fiber to said assembly.

2. An optical fiber junction device fabricated by the steps of claim 1.

3. An optical fiber junction device according to claim 2 wherein said optical fibers are composed of a plurality of optical fibers junction units each having a plurality of optical fibers.

* * * * *